Aug. 11, 1964 M. R. SCHOOLEY 3,143,822
BITE SIGNAL FOR FISHING RODS
Filed March 13, 1962
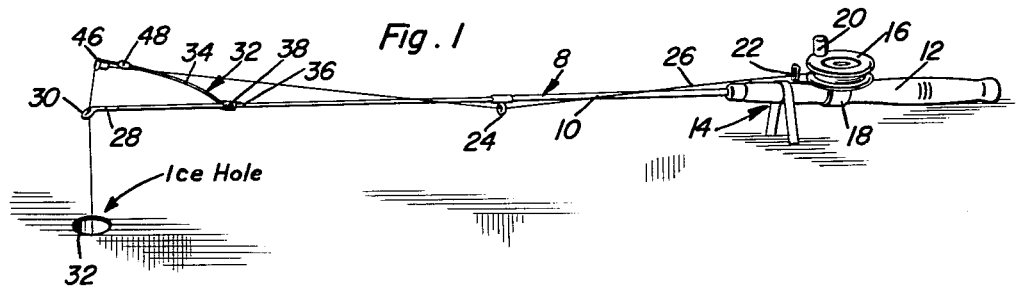
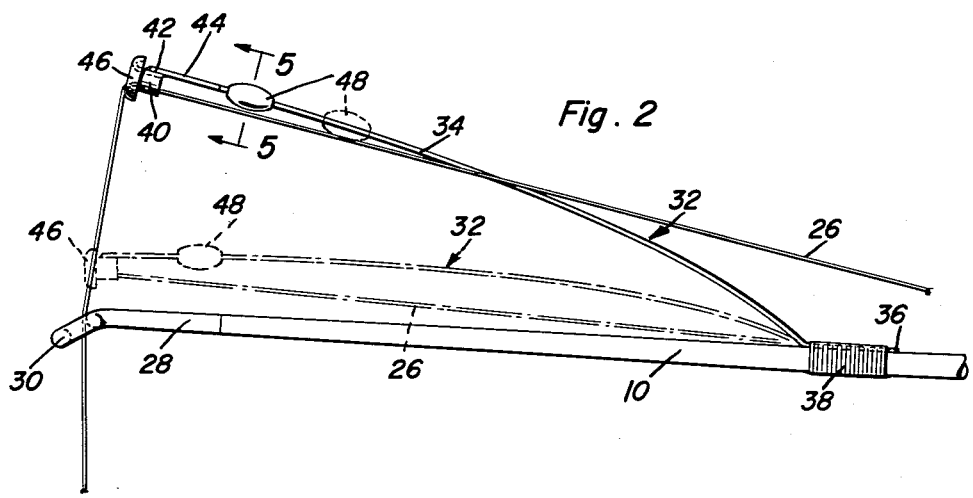
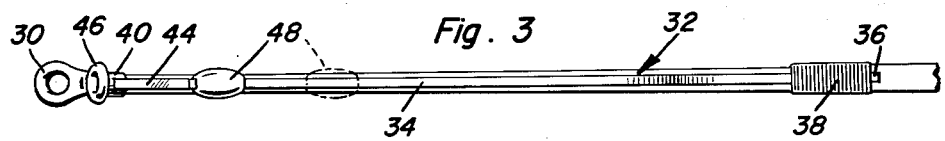
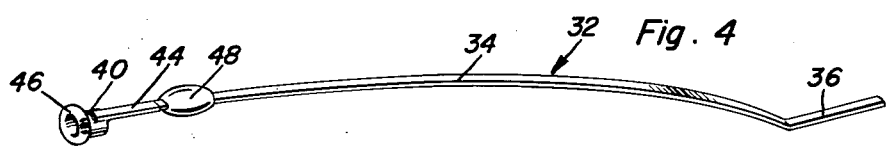
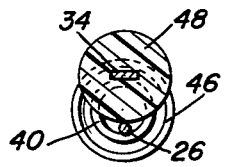
Marvin R. Schooley
INVENTOR.

United States Patent Office 3,143,822
Patented Aug. 11, 1964

3,143,822
BITE SIGNAL FOR FISHING RODS
Marvin R. Schooley, 907 W. Montcalm St.,
Greenville, Mich.
Filed Mar. 13, 1962, Ser. No. 179,333
2 Claims. (Cl. 43—17)

The present invention relates to a visual-type bite-signalling, reel-equipped fishing rod and has reference, more particularly stated, to an adaptation thereof which is effectually adapted for ice fishing.

Ice fishermen, unlike other anglers and fishermen, achieve highly satisfactory results and are reputed to make large catches with highly simple and economical tackle or equipment. Such equipment includes, among other simplified contrivances, bite-indicating signalling devices such as are generally classified as tip-ups and which usually embody flashy flags and the like to attract the user's attention in a now generally well known manner. This is not to imply that the present invention is, strictly speaking, a signalling tip-up. Although it achieves a similar end result it is more in the nature of a colorful bobber. It is unique in that it is carried by and constitutes a component part of the eye-equipped tip on the leading or outer end of the fishing rod. Accordingly, the present invention has to do with an easy-to-see signal which comes into play when a strike is had and which alerts the fisherman to pick up the rod and play the fish.

As indicative of the state of the art to which the present invention relates attention may be directed to a prior patent to one Logsdon covering a bite-indicating device for anglers, Patent 3,012,352, of December 12, 1961. Reference to this patent will show that it is old in the art to provide a pull-actuated swingable or movable indicator having eye means at the leading end cooperating with the underlying eye on the tip of the rod. Further, the prior patent shows means for adjusting the balance or sensitivity of the arm and relies in part upon spring action.

An objective in the instant matter is to structurally, functionally and otherwise improve on the stated prior patent and, in doing so, to advance the art, and to provide ice fishermen with a structurally and functionally distinct indicator which, being in a class by itself, constitutes an innovation in this line of endeavor.

In carrying out the preferred embodiment of the invention a flexibly resilient arm or an equivalent member, here referred to as a vibrating finger, is utilized. One end is attached to the fishing rod for support. The other end is free and above the line guide on the rod and itself terminates in a colorfully distinct eye or eyelet which provides the primary bite-indicating signal.

The invention also features an arm or finger which is characterized by an elongate suitably bowed leaf spring which may flex toward and from the rod, does not turn or twist about its own axis and does not sway from side to side. The outer end has a red or an equivalently colored eyelet and in addition, a colored bead or the like is slidably adjustable on the finger, functions as a secondary signal and also functions as a counter-weight when adjusting the sensitivity of action of the leaf spring.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of a fishing rod equipped with means providing the signalling results desired and showing the same in use;

FIGURE 2 is a view on a larger scale showing the lefthand or forward end portion of the rod and, more particularly, the full line and dotted line normal and signalling positions of the bite-signalling arm or finger;

FIGURE 3 is a top plan view of the construction and arrangement depicted in FIGURE 2;

FIGURE 4 is a view in perspective of the bite-signalling means as an attachment and detached from the rod; and FIGURE 5 is an enlarged cross-section on the section line 5—5 of FIGURE 2 looking in the direction of the arrows.

With reference now to the drawing and with particular reference to FIGURE 1 the fishing rod, which may be said to be a simple or ordinary type is denoted generally by the numeral 8 and comprises the rod proper 10 having a suitable handgrip 12 at the inner end, said handgrip carrying an inverted U-shaped leg member 14 which constitutes a stand and which permits the rod to be placed atop the ice when it is not being angled. The simple spool or reel is denoted at 16 and is mounted by way of a clamp, clip or equivalent means 18 on the handle. The numeral 20 designates the hand crank and 22 a suitable line guide eye on the handle cooperable with the intermediate guide eye 24 for the line 26. The lefthand end of the rod is provided with a common tip 28 terminating in a line guide eye 30 registrable in practice with the hole 32 in the ice. The essence of the concept whether it be treated as an attachment in FIG. 4 or in combination with the rod and reel assembly in FIG. 1 has to do with the pull-responsive line guiding and signalling means. This means is characterized by a flexibly resilient attachment 32, more particularly a longitudinally bowed leaf spring or equivalent vibratory member or finger 34. This finger (FIG. 4) is provided at a rearward or inner end with a straight laterally offset portion 36 which constitutes a shank. This shank is mounted atop the rod as shown in FIG. 2 and secured in place by tightly wrapped cord or equivalent means 38. The finger is opposed to the rod but diverges therefrom. It is preferably rectangular in cross-section as shown in FIG. 5. The forward or outer free end portion of the finger terminates in an auxiliary line-threading and suspending eye. More particularly this eye comprises an eyelet embodying a thimble or sleeve 40 which is welded or otherwise fixedly secured at 42 to the outer color-coated portion 44 of the finger. The outer peripheral surface of the thimble portion is secured to the underneath side of the rod, has an endless flange 46 encircling the forward end and, considered as an entity, is also color-coated. The color is preferably an easy-to-see red. In addition (this being an optional feature) an egg-shaped or an equivalent bead 48 is provided and slidingly mounted on the finger in the manner shown and is shiftable toward and from the signaling means 44 and 46. This bead may be stationary and simply colored to contribute to the other signaling means (40 and 44) or it may be made sufficiently heavy that it constitutes a counter-weight and may be shifted left to right as shown in full and dotted lines in FIG. 2 in a manner to appropriately adjust the sensitivity of action of the finger 34.

It will be evident to the user that with the construction herein shown and described the pull-responsive spring bobber or bite-signalling means enables the user to satisfactorily catch fish at any depth without touching the bobber. It is more sensitive and effective than other prior art adaptations. The signalling devices on the free flexible end are easy to see and consequently highly effective for the purposes intended.

With this construction one can determine whether the fish is coming up with the bait or whether the bait is going down with the fish whereby to ensure attainment of effective results under varying fishing requirements and conditions. It is reiterated that the signalling device is not a conventional-type tip-up. Also, it will be evident that there is nothing to break inasmuch as there is nothing for the line to tangle around. The adaptation is such as to enable the fisherman to resort to still fishing procedures or to, if desired, employ a jig.

The construction is simple and has no moving parts to get out of order. It is easily applied and removed and is inexpensive. There is no cork to freeze in the ice. Therefore it is submitted that the invention constitutes a novel contribution to the art to which it relates.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a fishing rod having a handle at its inner end and line-guide eye fixed in place at its outer end, a readily attachable bite-signalling attachment for an outer end portion of said fishing rod comprising a relatively short leaf spring proportional in width and cross-section to that portion of the rod with which it is cooperable, said leaf spring having a rearward end portion which is laterally bent to provide a relatively short rigid tang, said tang residing lengthwise atop a cooperating surface of said fishing rod and being securely fastened in place on said rod by tightly wound wrapping cord, a collar-like thimble providing a line responsive signalling eye, said leaf spring having a forward terminal end rigidly secured to a cooperating surface of and supporting said thimble, the forward end of said thimble terminating in an endless outstanding flange flared outwardly, encompassing said forward end and constituting an anti-chafing line guide, said thimble being brightly colored so that when it is actively bobbing and otherwise moving the desired bite signalling result is thus achieved, and a vividly colored easy-to-see bead slidingly mounted on a median portion of said leaf spring.

2. The structure defined in claim 1 and wherein said bead constitutes a manually adjustable counterweight which is capable of regulating and varying the leaf spring's sensitivity, and also wherein said leaf spring has planar top and bottom surfaces which are parallel to each other and generally parallel to that portion of the rod which is proximal thereto and cooperable therewith.

References Cited in the file of this patent

UNITED STATES PATENTS

| | | |
|---|---|---|
| 796,948 | Tuttle | Aug. 8, 1905 |
| 1,181,668 | Johnson | May 2, 1916 |
| 1,317,843 | Wehner et al. | Oct. 7, 1919 |
| 2,143,997 | Parkinson | Jan. 17, 1939 |
| 2,196,784 | Simmons et al. | Apr. 9, 1940 |
| 2,502,846 | Hoffman | Apr. 4, 1950 |
| 2,714,270 | Premo | Aug. 2, 1955 |
| 2,753,644 | Abel | July 10, 1956 |
| 2,931,122 | Thordson et al. | Apr. 5, 1960 |
| 3,012,352 | Logsdon | Dec. 12, 1961 |
| 3,057,105 | Moses | Oct. 9, 1962 |

FOREIGN PATENTS

| | | |
|---|---|---|
| 410,781 | Great Britain | May 17, 1934 |